Oct. 22, 1963 L. A. VARON 3,107,394
EMBOSSING DEVICE
Filed Sept. 27, 1962
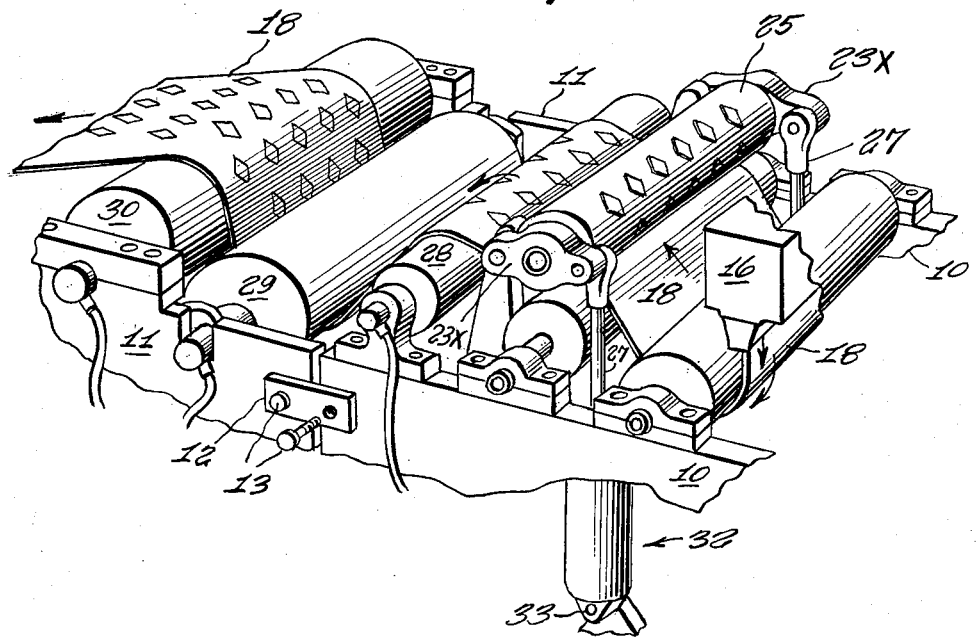
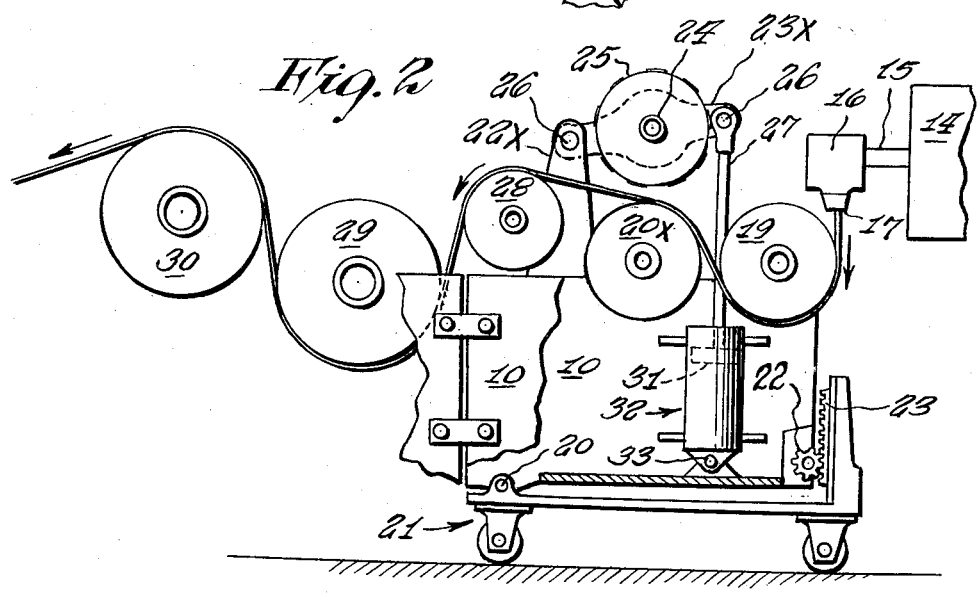

3,107,394
EMBOSSING DEVICE
Louis A. Varon, Cantiaque Road, Westbury, N.Y.
Filed Sept. 27, 1962, Ser. No. 226,561
1 Claim. (Cl. 18—10)

This invention relates to an embossing device and more particularly to an improvement in embossing machines used in the embossing of continuously extruded plastic sheet.

In the prior art embossing procedure now in use, the extruded sheet of, for example, the polymer polyvinyl chloride, is fed by gravity in between a suitably cooled embossing roll and a co-acting rubber covered roll disposed in parallel axial horizontal relationship thereto. After being embossed the sheet material is passed over a first water cooled roll and thence into a stack section where additional cooling is effected by a pair of water cooled rolls of relatively large diameter.

It is obvious from the prior art device, that the machine must be stopped when a new embossing roll is to be used to produce a new pattern on the plastic sheet.

Such a shut down of the machine is very expensive as the down time may be a relatively long time, in as much as the extrusion procedure is stopped and must be restarted.

Since smooth or non-embossed sheet is a substantial volume item in commerce, applicant has invented a device whereby the embossing roll may be replaced with a roll of different design without stopping the machine.

During the interval between removing the old embossing roll and the engagement of the new embossing roll, the machine produces smooth stock.

Thus according to this invention a continuous sheet of plastic film is produced which has embossed areas successively followed by smooth or non-embossed areas.

Accordingly an advantage of this invention is that the machine is not stopped in order to produce another embossed pattern on the sheet.

It is an object of this invention to provide an embossing machine for embossing extruded plastic sheet adapted to receive embossing rolls without shutting off the machine.

It is another object of this invention to provide a continuously operating machine which will produce selectively embossed areas followed by smooth or non-embossed areas.

It is a further object of this invention to provide a means for economically producing continuously embossed or smooth sheet of any desirable length.

These and other objects of this invention will become apparent upon reading the following descriptive disclosure of an illustrative embodiment of this invention taken in conjunction with the accompanying drawing, in which FIG. 1 is a perspective view, broken-away in part, of the invention showing the manner of vertically disposing the embossing roll over a cooled co-acting roll disposed in parallel axial relationship therebeneath and showing the embossing roll in the embossing position, and FIG. 2 is a schematic side elevation view, broken-away in part, and showing the manner of elevating the take-up roll to the extrusion aperture and showing the embossing roll in the raised position prior to being replaced by another embossing roll without turning off the machine.

As shown in the drawing, a conventional frame 10 of a substantially rectangular configuration is adapted to be removably secured to a second rectangular frame 11 (FIG. 1) by means of a plurality of plates 12 secured into respective screw threaded apertures disposed in frames 10 and 12. The plates 12 are secured to said frames by means of suitably threaded bolts each having a shank having a suitable length of threads followed by a suitable non-threaded length disposed adjacent the bolt head.

As shown in the drawing frames 10 and 11 are suitably spaced-apart to permit frame 10 to be tilted relative to the horizontal plane on the non-threaded shank area of bolts 13.

A conventional heated container 14 having a suitable piston therein forces molten plastic through conduit 15 into the extrusion chamber 16 having a conventional die 17 secured thereto.

The hot extruded plastic sheet 18 engages a suitable take-up roll 19 which is suitably temperature controlled by conventional means, for example, steam. The distance of travel from die 17 to engagement with the take-up roll 19 is very important to obtain uniform width quality and thickness of the sheet 18.

To vary selectively this distance between die 17 and take-up roll 19 the entire frame 10 may be tilted within predetermined limits. As shown in FIG. 2, the frame 10 is pivotally secured by means of a pivot pin 20 on each side of the frame to a conventional wheeled carriage 21. A conventional hand operated gear wheel 22 engages a conventional vertically disposed rack 23, said rack being integral to said carriage 23. Clearly manipulation of the hand operated gear 22 raises or lowers the take-up roll 19 as desired.

The film disposed about the conventionally controlled heat take-off roll 19 proceeds to the top of rubber covered roll 20X, which is a conventional water cooled roll. Disposed substantially vertically over the roll 20X is the embossing roll 25. The embossing roll 25 is pivotally supported at each of its ends upon a pair of opposed upright stanchion 22X secured as by welding to frame 10.

A pair of conventional removable housing 23X with a conventional bearing therein are slidingly disposed on the hollow trunnions 24 of an embossing roll 25 and a pivot pin 26 is removeably disposed through a respective aperture in each housing end and into a co-acting aperture in stanchion 22X.

The other end of each of the housing 23X are each secured by a removeable pivot pin 26 disposed in an aperture located in a respective piston rod 27.

The hollow trunnions or axles, one on each end of the embossing roll 25, are engaged intermediate the embossing roll and a respective housing 23X by a pair of spaced-apart conventional hooks secured to an overhead traveling crane.

After the embossing operation, the sheet is passed over a first cooling roll 28 having conventional hollow trunnions to receive cooling water. The sheet is then conducted into the second frame 11 where a pair of conventional water cooled rolls 29 and 30 cool the sheet suitably to permit it to be rolled up for shipment or storage without sticking together.

Manifestly, movement of the piston rod 27 upwardly raises the embossing roll 25 from engagement with the sheet 18. Also, movement of the piston rod 27 selectively downwardly causes the embossing roll 25 to engage the plastic sheet 18 with selectively increasing pressure to produce a desired embossing effect.

The rod 27 may be moved in a selectively controlled manner in any of a number of different ways. Preferably the rod 27 is secured to a conventional piston 31 located in a conventional chamber 32. Such a chamber 32 is provided with conventional conduit means to permit force to be applied to either face of the piston 31. As shown the piston 32 is hingedly secured to the frame 10 by means of a hinge pin 33.

Thus cooling water is applied to hollow rolls 20X, 25, 28, 29 and 30. However, heating means, for example steam, is introduced as desired to the take-up roll 19.

In the operation of this device the rolls are actuated by conventional means, for example sprocket and chain means, to obtain a uniform surface speed on each roll regardless of its diameter.

Roll 20X may be provided with variable means to increase or decrease the rotation of the roll, since this roll is subject to considerable wear and must be ground down from time to time.

In the substitution of one embossing roll for another in the machine, the roll 25 is elevated above the sheet 18 by suitable upward movement of rods 27. When this happens smooth sheet is produced, which subsequently is cut out and sold as smooth material.

The hooks of the overhead crane then engage the trunnions of the embossing roll 25 interiorly of each respective housing 23. Next, the pivot pins 26 are removed from the stanchions 22 and rods 27. The housing 23X are then slipped or pulled off each respective trunnion and the crane moves the old embossing roll 25 to storage, returning with a new embossing roll and the trunnions thereon. Whereupon the housings 23X are pushed onto the new embossing roll and the pivot pins 26 are then inserted into their former apertures securing the respective housings 23X to said new embossing roll.

Meanwhile the machine is continuously producing smooth sheet. Then the new embossing roll is selectively slowly moved upon the running sheet 18 to produce embossed sheet stock having the new pattern of said new embossing roll.

The invention has been illustrated by an embodiment thereof, but it is not limited to this illustrative embodimen as it is of greater scope and includes variants thereof within the skill of the art.

I claim.

An embossing device for selectively and continuously producing plastic sheet having alternately an embossed linear section followed by a smooth linear section, comprising, a substantially rectangular frame, a take-up roll mounted on the rear end of said frame, die means disposed above and suitably adjacent to said take-up roll for extruding continuously a sheet of hot plastic sheet upon said take-up roll, a water cooled rubber covered back-up roll disposed on said frame next to said take-up roll, an embossing roll having suitably long journals at each end disposed substantially vertically over said back-up roll with the axes of said rolls being in parallel relationship, rocker means comprising a fixed pair of spaced-apart suitably apertured stanchions secured to opposed sides of said frame forward of said back-up roll, a suitable dual apertured housing with a bearing therein disposed removeably on each journal end, a suitably apertured piston rod disposed suitably adjacent one end of each of said housings, a pair of removeable pivot pins disposed through each of the apertures of each of said housing and respectively through the aperture of a stanchion and the aperture of a co-acting piston rod, piston means engaging said piston rods secured to said frame for selectively raising and lowering said piston rods, gear means secured to said frame, a wheeled substantially rectangular carriage disposed beneath said frame, pivot means disposed at the front end of said carriage securing said frame hingedly to said carriage and vertical rack means, engaging said gear means, on said carriage, whereby selective movement of said gear means hingedly moves said frame and the take-up roll secured thereon toward and away from said die means.

References Cited in the file of this patent
UNITED STATES PATENTS

| | | |
|---|---|---|
| 1,297,482 | Little | Mar. 18, 1918 |
| 1,440,007 | Freeman et al. | Dec. 26, 1922 |
| 2,514,213 | Mason et al. | July 4, 1950 |
| 2,562,078 | Winnek | July 24, 1951 |
| 2,688,769 | Corbett | Sept. 14, 1954 |
| 2,696,638 | Bower | Dec. 14, 1954 |